US008845085B2

(12) United States Patent
Kobayashi et al.

(10) Patent No.: US 8,845,085 B2
(45) Date of Patent: Sep. 30, 2014

(54) IMAGE RECORDING METHOD, AND SET OF INK JET INK AND LIQUID COMPOSITION

(71) Applicant: Canon Kabushiki Kaisha, Tokyo (JP)

(72) Inventors: Satoru Kobayashi, Yokohama (JP); Takahiro Mori, Inagi (JP); Shinichi Sakurada, Tokyo (JP); Yutaka Kurabayashi, Higashimurayama (JP)

(73) Assignee: Canon Kabushiki Kaisha, Tokyo (JP)

( * ) Notice: Subject to any disclaimer, the term of this patent is extended or adjusted under 35 U.S.C. 154(b) by 161 days.

(21) Appl. No.: 13/665,297

(22) Filed: Oct. 31, 2012

(65) Prior Publication Data

US 2013/0141503 A1    Jun. 6, 2013

(30) Foreign Application Priority Data

Dec. 2, 2011 (JP) ................. 2011-264878

(51) Int. Cl.
*C09D 11/00* (2014.01)
*C09D 11/106* (2014.01)
*C09D 11/40* (2014.01)
*C09D 11/30* (2014.01)
*C09D 11/54* (2014.01)

(52) U.S. Cl.
CPC ............. *C09D 11/30* (2013.01); *C09D 11/106* (2013.01); *C09D 11/40* (2013.01); *C09D 11/54* (2013.01)
USPC ....................................... 347/100

(58) Field of Classification Search
USPC ....................................... 347/100
See application file for complete search history.

(56) References Cited

U.S. PATENT DOCUMENTS

| | | |
|---|---|---|
| 4,954,395 A | 9/1990 | Hasegawa et al. |
| 5,027,131 A | 6/1991 | Hasegawa et al. |
| 5,059,983 A | 10/1991 | Higuma et al. |
| 5,081,470 A | 1/1992 | Kurabayashi et al. |
| 5,120,601 A | 6/1992 | Kotaki et al. |
| 5,124,201 A | 6/1992 | Kurabayashi et al. |
| 5,137,778 A | 8/1992 | Nakatsugawa et al. |
| 5,139,868 A | 8/1992 | Mori et al. |
| 5,140,339 A | 8/1992 | Higuma et al. |
| 5,171,626 A | 12/1992 | Nagamine et al. |
| 5,246,774 A | 9/1993 | Sakaki et al. |
| 5,271,989 A | 12/1993 | Mori et al. |
| 5,277,962 A | 1/1994 | Nakatsugawa et al. |
| 5,314,713 A | 5/1994 | Mori et al. |
| 5,362,558 A | 11/1994 | Sakaki et al. |
| 5,415,686 A | 5/1995 | Kurabayashi et al. |
| 5,439,515 A | 8/1995 | Kurabayashi et al. |
| 5,526,031 A | 6/1996 | Kurabayashi |
| 5,549,740 A | 8/1996 | Takahashi et al. |
| 5,614,007 A | 3/1997 | Kurabayashi et al. |
| 5,618,338 A | 4/1997 | Kurabayashi et al. |
| 5,623,294 A | 4/1997 | Takizawa et al. |
| 5,624,484 A | 4/1997 | Takahashi et al. |
| 5,651,814 A | 7/1997 | Shimomura et al. |
| 5,700,314 A | 12/1997 | Kurbayashi et al. |
| 5,734,403 A | 3/1998 | Suga et al. |
| 5,792,249 A | 8/1998 | Shirota et al. |
| 5,835,116 A | 11/1998 | Sato et al. |
| 5,849,815 A | 12/1998 | Aoki et al. |
| 5,985,975 A | 11/1999 | Kurbayashi et al. |
| 6,027,210 A | 2/2000 | Kurbayashi et al. |
| 6,238,045 B1 | 5/2001 | Ono et al. |
| 6,322,209 B1 | 11/2001 | Sato et al. |
| 6,341,855 B1 | 1/2002 | Kurbayashi |
| 6,342,096 B1 | 1/2002 | Kurbayashi |
| 6,367,921 B1 | 4/2002 | Kurbayashi et al. |
| 6,398,355 B1 | 6/2002 | Shirota et al. |
| 6,399,674 B1 | 6/2002 | Kashiwazaki et al. |
| 6,412,936 B1 | 7/2002 | Mafune et al. |
| 6,460,989 B1 | 10/2002 | Yano et al. |
| 6,471,757 B1 | 10/2002 | Koitabashi et al. |
| 6,517,199 B1 | 2/2003 | Tomioka et al. |
| 6,521,323 B1 | 2/2003 | Sakaki et al. |
| 6,536,890 B1 | 3/2003 | Kato et al. |
| 6,719,420 B2 | 4/2004 | Tomioka et al. |
| 6,746,114 B2 | 6/2004 | Takahashi et al. |
| 6,780,901 B1 | 8/2004 | Endo et al. |
| 6,790,878 B2 | 9/2004 | Kurabayashi |
| 6,794,427 B2 | 9/2004 | Kurabayashi et al. |
| 6,821,328 B2 | 11/2004 | Tomioka et al. |
| 6,966,944 B2 | 11/2005 | Shimomura et al. |
| 7,198,837 B1 | 4/2007 | Endo et al. |
| 7,208,032 B2 | 4/2007 | Hakamada et al. |
| 7,285,310 B2 | 10/2007 | Kanke et al. |
| 7,297,194 B2 | 11/2007 | Shinjo et al. |
| 7,503,649 B2 | 3/2009 | Kishi et al. |
| 7,517,073 B2 | 4/2009 | Nito et al. |
| 7,517,074 B2 | 4/2009 | Hakamada et al. |
| 7,976,148 B2 | 7/2011 | Kishi et al. |
| 8,282,725 B2 | 10/2012 | Shimomura et al. |
| 2008/0055385 A1* | 3/2008 | Houjou ........................ 347/213 |
| 2010/0055421 A1* | 3/2010 | Carmody et al. ............. 428/208 |
| 2011/0001775 A1 | 1/2011 | Nishiwaki et al. |
| 2011/0104453 A1 | 5/2011 | Shinjo et al. |
| 2011/0261129 A1 | 10/2011 | Harada et al. |

FOREIGN PATENT DOCUMENTS

| | | |
|---|---|---|
| JP | 2002-302627 A | 10/2002 |
| JP | 2011-011449 A | 1/2011 |
| JP | 2011-026553 A | 2/2011 |

* cited by examiner

*Primary Examiner* — Laura Martin
(74) *Attorney, Agent, or Firm* — Fitzpatrick, Cella, Harper & Scinto

(57) ABSTRACT

An image recording method including applying an ink containing a coloring material and a polymer particle to a recording medium from a recording head of an ink jet system and applying a liquid composition which destabilizes a dispersed state of the polymer particle in the ink to at least a part of a region of the recording medium where the ink is applied, wherein the polymer particle in the ink has core and shell portions, the shell portion contains a copolymer A having a unit (50-90% mass) derived from a compound (a1) represented by a general formula (1) or (2) and a unit (10-50% mass) derived from an $\alpha,\beta$-unsaturated hydrophobic compound (a2), and the core portion contains a polymer of an $\alpha,\beta$-unsaturated hydrophobic compound (b).

6 Claims, No Drawings

IMAGE RECORDING METHOD, AND SET OF INK JET INK AND LIQUID COMPOSITION

BACKGROUND OF THE INVENTION

1. Field of the Invention

The present invention relates to an image recording method, and a set of an ink jet ink and a liquid composition.

2. Description of the Related Art

In an image recording method, two-liquid reaction systems using a pigment ink and a liquid composition containing a reaction agent destabilizing a dispersion state of a pigment in the ink have heretofore been investigated. Among the two-liquid reaction systems, an image recording method using an ink containing a polymer particle reacting with the reaction agent has been investigated (Japanese Patent Application Laid-Open No. 2002-302627). Japanese Patent Application Laid-Open No. 2002-302627 discloses an image recording method using an ink containing a pigment and a cationic polymer particle and a liquid composition containing an anionic reaction agent and an anionic polymer particle and describes that the suppression of blurring and bleeding is improved.

On the other hand, a polymer particle of a core-shell structure is used in a field of an ink jet ink (Japanese Patent Application Laid-Open No. 2011-026553 and Japanese Patent Application Laid-Open No. 2011-011449). Japanese Patent Application Laid-Open No. 2011-026553 and Japanese Patent Application Laid-Open No. 2011-011449 describe a clear ink and an ink containing a polymer particle of a core-shell structure in which a core is formed of a hydrophobic polymer, and a shell is formed of a polymer having an ionic hydrophilic group.

SUMMARY OF THE INVENTION

However, when the ink of the two-liquid reaction system described in Japanese Patent Application Laid-Open No. 2002-302627 was ejected from a recording head of an ink jet system, ejection stability was low. The present inventors have carried out an investigation on an image recording method of a two-liquid reaction system using an ink containing the polymer particle described in Japanese Patent Application Laid-Open No. 2011-026553 and Japanese Patent Application Laid-Open No. 2011-011449 and a liquid composition containing a reaction agent. As a result, an effect to suppress blurring of the resulting image and the water resistance of the image have been low.

Accordingly, it is an object of the present invention to provide an image recording method of a two-liquid reaction system, by which ejection stability of an ink is improved, and an effect to suppress blurring of the resulting image and improvement of water resistance of the image are simultaneously achieved at a high level, and a set of an ink jet ink and a liquid composition.

The above object can be achieved by the present invention described below. According to the present invention, there is thus provided an image recording method comprising applying an ink containing a coloring material and a polymer particle to a recording medium from a recording head of an ink jet system and applying a liquid composition which destabilizes a dispersion state of the polymer particle in the ink to at least a part of a region of the recording medium where the ink is applied, wherein the polymer particle in the ink has a core portion and a shell portion, the shell portion contains a copolymer A having a unit derived from a compound (a1) represented by a general formula (1) of $R_1-(C_2H_4O)_n-C_2H_4OCO-R_2-COOH$ where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less or a general formula (2) of $R_1-(C_2H_4O)_n-C_2H_4O-R_2-COOH$ where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less and having a unit derived from an α,β-unsaturated hydrophobic compound (a2), a proportion of the unit derived from the compound (a1) to the copolymer A is 50% by mass or more and 90% by mass or less, a proportion of the unit derived from the compound (a2) to the copolymer A is 10% by mass or more and 50% by mass or less, and the core portion contains a polymer of an α,β-unsaturated hydrophobic compound (b).

According to the present invention, there is also provided a set of an ink jet ink and a liquid composition, comprising an ink jet ink containing a coloring material and a polymer particle and a liquid composition which destabilizes a dispersion state of the polymer particle in the ink, wherein the polymer particle in the ink has a core portion and a shell portion, the shell portion contains a copolymer A having a unit derived from a compound (a1) represented by a general formula (1) of $R_1-(C_2H_4O)_n-C_2H_4OCO-R_2-COOH$ where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less or a general formula (2) of $R_1-(C_2H_4O)_n-C_2H_4O-R_2-COOH$ where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less and having a unit derived from an α,β-unsaturated hydrophobic compound (a2), a proportion of the unit derived from the compound (a1) to the copolymer A is 50% by mass or more and 90% by mass or less, a proportion of the unit derived from the compound (a2) to the copolymer A is 10% by mass or more and 50% by mass or less, and the core portion contains a polymer of an α,β-unsaturated hydrophobic compound (b).

According to the present invention, there can be provided an image recording method of a two-liquid reaction system, by which ejection stability of an ink is improved, and an effect to suppress blurring of the resulting image and water resistance of the image are simultaneously achieved at a high level, and a set of an ink jet ink and a liquid composition.

Further features of the present invention will become apparent from the following description of exemplary embodiments.

DESCRIPTION OF THE EMBODIMENTS

Preferred embodiments of the present invention will now be described in detail. Incidentally, "(meth)acrylic acid" and "(meth)acrylate" hereinafter mean "acrylic acid" and "methacrylic acid", and "acrylate" and "methacrylate", respectively.

The present inventors have investigated the cause of the low ejection stability of the ink when the ink of the two-liquid reaction system described in Japanese Patent Application Laid-Open No. 2002-302627 was ejected from a recording head of an ink jet system. The polymer particle described in Japanese Patent Application Laid-Open No. 2002-302627 is synthesized by emulsion polymerization using a surfactant as an emulsifier. In the case where the surfactant is used as the emulsifier to conduct the emulsion polymerization, the surfactant is generally used in an amount more than a critical micelle concentration for always stably retaining an emulsion state in a polymerization system. Therefore, a surfactant contributing to no polymerization and a surfactant separated from a polymer particle obtained by the emulsion polymerization are present to no small extent in an ink containing the polymer particle obtained by the emulsion polymerization. When the surfactant remains in the ink in such a manner, a phenomenon that a bubble generated in a liquid becomes hard to disappear occurs. This is attributable to the remaining surfactant which stabilizes the bubble. When such an ink is ejected from a recording head of an ink jet system, the ejection stability of the ink is considered to be lowered by the influence of the bubble generated in the ink. Thus, the present inventors have led to the conclusion that it is important to synthesize a polymer particle by a polymerization process using no surfactant like the polymer particle of the core-shell structure described in Japanese Patent Application Laid-Open No. 2011-026553 and Japanese Patent Application Laid-Open No. 2011-011449.

However, when the ink containing the polymer particle described in Japanese Patent Application Laid-Open No. 2011-026553 and Japanese Patent Application Laid-Open No. 2011-011449 was applied to an image recording method of the two-liquid reaction system, the effect to suppress blurring of the resulting image and the water resistance of the image became low as described above. The present inventors have investigated the reason for this and found the following. The polymer particle described in Japanese Patent Application Laid-Open No. 2011-026553 and Japanese Patent Application Laid-Open No. 2011-011449 is provided on the prerequisite that it is used in a clear ink, and its investigation is made for the purpose of improving the gloss evenness of the resulting image. Therefore, the polymer particle described in Japanese Patent Application Laid-Open No. 2011-026553 and Japanese Patent Application Laid-Open No. 2011-011449 is designed so as to impart high softness. When the softness of the polymer particle is high, it is considered that the softness of the resulting image becomes high even when the ink reacts with the liquid composition containing a reaction agent, and so the blurring of the image cannot be sufficiently suppressed. In addition, the polymer particle described in Japanese Patent Application Laid-Open No. 2011-026553 and Japanese Patent Application Laid-Open No. 2011-011449 has a lot of ionic groups derived from an acid monomer on the surface thereof. Accordingly, even when the ionic groups react with the reaction agent, and part thereof are converted to nonionic groups, an ionic group contributing to no reaction is present to some extent in the resulting image, so that the water resistance of the image is considered to be lowered.

From the reasons described above, the present inventors have carried out various investigations on a polymer particle which can be synthesized by a polymerization process using no surfactant and is suitable for use in the image recording method of the two-liquid reaction system, thus leading to completion of the present invention. This will hereinafter be described in detail.

In order to synthesize a polymer particle without using a surfactant, it is necessary to preliminarily synthesize a specific polymer acting like an emulsifier upon polymerization and then add a hydrophobic compound high in compatibility with the polymer to polymerize the compound.

In order for the polymer to act like an emulsifier upon polymerization, the polymer is favorably a copolymer having a hydrophobic site and a hydrophilic site. In addition, since the polymer acting like the emulsifier is present on the surface side of the resulting polymer particle, the polymer is a portion greatly contributing to the dispersion stability of the polymer particle in an ink and the reactivity with the liquid composition. From the viewpoints described above, various compounds have been investigated. As a result, it has been found that it is effective to use, as the polymer acting like the emulsifier, a copolymer (hereinafter, also referred to as "copolymer A" in the present invention) having at least a unit derived from a compound (a1) represented by a general formula (1) of $R_1-(C_2H_4O)_n-C_2H_4OCO-R_2-COOH$ where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less or a general formula (2) of $R_1-(C_2H_4O)_n-C_2H_4O-R_2-COOH$ where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less and having a unit derived from an α,β-unsaturated hydrophobic compound (a2). Since the copolymer A has a hydrophilic site (the unit derived from the compound (a1)) and a hydrophobic site (the unit derived from the compound (a2)), the copolymer A can form an aggregate like a micelle, in which the hydrophobic site and the hydrophilic site are oriented inside and outside, respectively, in water. The point of the present invention resides in that the compound (a1) represented by the general formula (1) or (2) is used as the compound which becomes the hydrophilic site of this compound A. The compound (a1) high in hydrophilicity because the compound has a polyethylene glycol structure $[(C_2H_4O)_n]$ and so can stably disperse the polymer particle. In addition, since the ionic group is present at a position distant from the main chain through the polyethylene glycol structure, steric hindrance is low, and so the compound is easy to react with the reaction agent. That is, the compound (a1) is used, whereby the dispersion stability of the polymer particle in the ink and the reactivity with the liquid composition can be simultaneously achieved.

According to an investigation by the present inventors, it has been found that a proportion of the unit derived from the compound (a1) and a proportion of the unit derived from the compound (a2) are required to satisfy specific conditions in order for the copolymer A to form the aggregate like a micelle. Specifically, it is necessary that the proportion of the unit derived from the compound (a1) to the copolymer A is 50% by mass or more and 90% by mass or less, and the proportion of the unit derived from the compound (a2) to the copolymer A is 10% by mass or more and 50% by mass or less. Incidentally, any of these proportions is based on the total mass of the compound A. When the proportions of the units do not fall within the respective ranges, a balance between the hydrophilicity and the hydrophobicity in the copolymer A is destroyed, and such a copolymer is hard to act like an emulsifier, so that a part thereof remains in the ink without contributing to the polymerization. As a result, the ejection stability of the ink has been lowered. Incidentally, it has been confirmed by the investigation by the present inventors that the above-described aggregate is formed even when the copolymer A is either a block copolymer or a random copolymer so far as the proportions of the units satisfy the respective ranges.

When the α,β-unsaturated hydrophobic compound (b) high in compatibility with the copolymer A is further added into a solution in which the aggregate of the copolymer A is present, the α,β-unsaturated hydrophobic compound (b) is incorporated in a high hydrophobic site inside the aggregate of the copolymer A. This hydrophobic compound is polymerized, whereby a polymer particle can be obtained. The reason why it is necessary to use the α,β-unsaturated hydrophobic compound (b) as the hydrophobic compound in the present invention is as follows. The α,β-unsaturated hydrophobic compound (b) is similar to the structure of the hydrophobic site (the unit derived from the compound (a2)) of the copolymer A and thus very high in the compatibility with the copolymer A. Therefore, such a compound is easily incorporated in the high hydrophobic site inside the copolymer A, whereby the polymer particle can be stably formed upon the polymerization. In addition, an interaction between the polymer of the α,β-unsaturated hydrophobic compound (b) and the copolymer A becomes very strong in the resulting polymer particle, so that the copolymer A is hard to be separated from the polymer particle. On the other hand, when a compound different from the α,β-unsaturated hydrophobic compound (b), for example, a compound high in hydrophilicity to some extent, is used, it is hard to stably synthesize the polymer particle, and the copolymer A is easy to be separated if synthesized, so that a polymer particle high in defoaming properties is not obtained.

According to the synthesis process described above, a polymer particle which is a polymer particle having a core portion and a shell portion toward the outside from the inside thereof and in which the shell portion contains the copolymer A having the unit derived from the compound (a1) represented by the general formula (1) or (2) and the unit derived from the α,β-unsaturated hydrophobic compound (a2), and the core portion contains the polymer of the α,β-unsaturated hydrophobic compound (b), is obtained.

The present inventors have further investigated a reason why a characteristic effect of the present invention is achieved by the resultant polymer particle. As a result, it has been found that the effect is influenced by the form of the polymer particle. Specifically, the polymer particle synthesized under the specific conditions described above becomes a form having a spherical core portion and a branched shell portion extending toward the outside (in a solvent) from the interior of the core portion. In the present invention, the copolymer A becomes the shell portion, and the polymer of the α,β-unsaturated hydrophobic compound (b) becomes the core portion. By taking such a form, very high water resistance can be developed by the core portion high in hydrophobicity when the polymer particle is used in the ink while sufficiently retaining the dispersion stability in the ink by the shell portion high in hydrophilicity. The respective components synergistically act according to the mechanism described above, whereby the above-described effect of the present invention which has not been achieved by the conventional two-liquid reaction system can be achieved.

Image Recording Method:

In the present invention, a method for applying an ink to a recording medium is an ink jet recording method having a step of ejecting the ink from a recording head of an ink jet system in response to a recording signal to conduct recording on the recording medium. In particular, an ink jet recording method of a system in which thermal energy is applied to an ink to eject the ink from an orifice of a recording head is favorable. In addition, a method for applying the liquid composition to the recording medium includes an ink jet system and a coating system. Examples of the coating system include a roller coating method, a bar coating method and a spray coating method. Incidentally, "recording" in the present invention includes a mode of conducting recording on a recording medium such as gloss paper or plain paper and a mode of conducting printing on a non-permeable recording medium such as glass, plastic or film.

The image recording method according to the present invention has two steps of Step (A) of applying an ink to the recording medium and Step (B) of applying a liquid composition to the recording medium so as to overlap at least a part of a region of the recording medium where the ink is applied. At this time, Step (B) may be conducted after Step (A), or Step (A) may be conducted after Step (B). In the case where the same step is conducted twice or more, the order may be any of, for example, Step (A)→Step (B)→Step (A) or Step (B)→Step (A)→Step (B). In particular, the method including a process of conducting Step (A) after Step (B) is more favorable because an effect to suppress blurring of the resulting image and an effect to improve water resistance of the image become great.

Set of Ink Jet Ink and Liquid Composition:

In the present invention, no particular limitation is imposed on an ink used in combination with the liquid composition, and a cyan ink, a magenta ink, a yellow ink or a black ink may be used. The ink and liquid composition used in the image recording method and the set of the ink and the liquid composition according to the present invention will hereinafter be described.

<1> Ink Jet Ink:

The ink used in the present invention contains a coloring material and a polymer particle. Respective components constituting the ink used in the image recording method and the set of the ink and the liquid composition according to the present invention will hereinafter be respectively described.

Resin Particle:

In the present invention, "polymer particle" means a polymer present in a state of being dispersed in a solvent to have a particle size. The 50% cumulative volume average particle size ($D_{50}$) of the polymer particle is favorably 30 nm or more. The particle size is more favorably 30 nm or more and 500 nm or less. Incidentally, the $D_{50}$ of the polymer particle in the present invention is measured by the following method. A polymer particle dispersion was diluted 50 times (by volume) with pure water and the measurement was conducted using UPA-EX150 (manufactured by NIKKISO) under the following measuring conditions: SetZero: 30 s, number of measurements: 3 times, measuring time: 180 seconds and refractive index: 1.5.

In the present invention, the content (% by mass) of the polymer particle in the ink is favorably 0.1% by mass or more and 20.0% by mass or less based on the total mass of the ink. If the content is less than 0.1% by mass, the effect to suppress blurring of the resulting image and the effect to improve the water resistance of the image may not be sufficiently achieved in some cases. If the content is more than 20.0% by mass on the other hand, the effect to improve the ejection stability of the resulting ink may not be sufficiently achieved in some cases.

As described above, the polymer particle used in the ink in the present invention has the spherical core portion and the branched shell portion. In the present invention, a proportion of the shell portion on the surface of the polymer particle is determined by measuring a surface functional group density. The surface functional group density is calculated out by a back titration method shown below. First, the polymer particle was adjusted to pH 2.0 with an aqueous solution of hydrochloric acid and then centrifuged for 30 minutes at 10,000 rpm, the resultant solids of the polymer particle were dried for 24 hours at ordinary temperature. After the drying, 1 g of the polymer particle was taken out, 30 g of a 0.1 mol/L aqueous solution of sodium hydrogencarbonate was added, the resultant mixture was stirred for 15 minutes, centrifugation was conducted for 60 minutes at 25° C. and 80,000 rpm, and 15 g of a supernatant liquid was then taken out. Water was added to this supernatant liquid to dilute the solution in such a manner that the total weight becomes 200 g, and titration was then conducted with a 0.1 mol/L aqueous solution of hydrochloric acid. The amount (mol) of a surface functional group per gram of the polymer particle was calculated from the resultant value to obtain the surface charge density (mol/g) of the polymer particle. In the present invention, the surface functional group density calculated out by this method is favorably 10 µmol/g or more and 320 µmol/g or less, more favorably 50 µmol/g or more and 200 µmol/g or less. The compounds constituting the polymer particle will hereinafter be respectively described.

(1) Copolymer A

The copolymer A has a unit derived from the compound (a1) represented by the general formula (1) or (2) and a unit derived from the α,β-unsaturated hydrophobic compound (a2). In the present invention, a proportion of the copolymer A to the polymer particle is favorably 10.0% by mass or more and 50.0% by mass or less based on the total mass of the polymer particle.

The copolymer A favorably has a weight average molecular weight of 3,000 or more and 200,000 or less in terms of polystyrene obtained by gel permeation chromatography (GPC). As described above, the copolymer A becomes the shell portion of the polymer particle and has an action of stabilizing the dispersion of the polymer particle. Therefore, if the molecular weight is less than 3,000, the resulting polymer particle cannot be stably dispersed in water, and so the effect to improve the ejection stability of the ink may not be sufficiently achieved in some cases. If the molecular weight is more than 200,000, the resulting polymer particle is excellent in dispersion stability, but the particle size of the polymer particle become large, so that a viscosity of the resulting ink is increased, and so the effect to improve the ejection stability of the ink may not be sufficiently achieved in some cases.

The copolymer A favorably has a moderate solubility for water and a moderate solubility for the compound (b). This is because since the copolymer A acts like an emulsifier in the polymerization process of the polymer particle as described above, and so it is hard to form the aggregate of the copolymer A if the solubility in water is too high. In addition, if the solubility in the compound (b) is too low, it is hard to incorporate the compound (b) in the high hydrophobic site inside the aggregate of the copolymer A. In any case, the polymerization may not be stably conducted in some cases. Thus, an investigation by the present inventors has revealed that the solubility of the copolymer A at 25° C. is favorably 1 g or less in 100 g of water. It has also been found that the solubility of the copolymer A at 25° C. is favorably 1 g or more in 100 g of the compound (b). The compounds constituting the copolymer A will hereinafter be respectively described.

Compound (a1) Represented by the General Formula (1) or (2)

In the present invention, in the general formula (1) of $R_1-(C_2H_4O)_n-C_2H_4OCO-R_2-COOH$ or the general formula (2) of $R_1-(C_2H_4O)_n-C_2H_4O-R_2-COOH$, $R_1$ is at least one selected from a vinyl group ($CH_2=CH-$), an allyl group ($CH_2=CH-CH_2-$), an acryloyl group ($CH_2=CHCOO-$) and a methacryloyl group ($CH_2=C(CH_3)COO-$), and $R_2$ is at least one selected from an alkylene group having 1 to 10 carbon atoms, a cycloalkylene group having 5 to 10 carbon atoms and a phenylene group. $R_2$ is favorably at least one selected from methylene, ethylene, propylene and phenylene groups. n is 10 or more and 100 or less. n is favorably 20 or more and 80 or less. If n is less than 10, a polyethylene glycol structure contributing to the hydrophilicity of the compound (a1) becomes short, so that the resulting polymer particle cannot be stably dispersed in water to lower the ejection stability of the resulting ink. If n is more than 100 on the other hand, the polyethylene glycol structure that is the hydrophilic site of the compound (a1) becomes long, so that the dispersion stability of the resulting polymer particle becomes excellent. However, the polymer particle becomes large, so that the viscosity of the resulting ink is easy to be increased, and the ejection stability of the ink is lowered.

In the present invention, the compound (a1) represented by the general formula (1) includes compounds obtained by subjecting to an esterification reaction a compound represented by a general formula (3) of $R_1-(C_2H_4O)_n-C_2H_4OH$ where $R_1$ is at least one selected from a vinyl group, an allyl group, an acryloyl group and a methacryloyl group, and n is 10 or more and 100 or less, and a compound represented by a general formula (4) of $HOOC-R_2-COOH$ where R2 is at least one selected from an alkylene group, a cycloalkylene group and a phenylene group. In addition, the compound (a1) represented by the general formula (2) includes compounds obtained by subjecting to an esterification reaction the compound represented by the general formula (3) and a compound represented by a general formula (5) of $X-R_2-COOH$ where $R_2$ is at least one selected from an alkylene group, a cycloalkylene group and a phenylene group, and X is a halogen atom. Examples of the compound represented by the general formula (3) include polyethylene glycol (meth)acrylates. Examples of the compound represented by the general formula (4) include malonic acid, succinic acid, adipic acid, phthalic acid, isophthalic acid, terephthalic acid and salts thereof. Examples of the compound represented by the general formula (5) include monohalogenocarboxylic acids such as monochloroacetic acid and monochlorobutanoic acid, and salts thereof.

α,β-Unsaturated Hydrophobic Compound (a2)

In the present invention, "α,β-unsaturated hydrophobic compound" means that such a compound is an α,β-unsaturated compound and a hydrophobic compound. In the present invention, "α,β-unsaturated compound" means a compound having an unsaturated bond (for example, C=C) between carbon of an α position and carbon of a β position. In the present invention, "hydrophobic compound" means a compound having no hydrophilic group (for example, an acidic group, basic group, hydroxyl group or alkylene oxide group). In the present invention, specific examples of the α,β-unsaturated hydrophobic compound include aromatic vinyl compounds such as styrene and α-methylstyrene; alkyl (meth) acrylates such as methyl (meth)acrylate, n-butyl (meth) acrylate, tert-butyl (meth)acrylate, 2-ethylhexyl (meth) acrylate and cyclohexyl (meth)acrylate; and (meth) acrylonitrile, vinyl acetate, alkyl vinyl ethers, vinylimidazole and ethylene. These compounds may be used either singly or in any combination thereof as needed. Among these α,β-unsaturated hydrophobic compounds, at least one selected from the aromatic vinyl compounds and the alkyl (meth) acrylates is favorable. At least one selected from styrene, stearyl (meth)acrylate and lauryl (meth)acrylate is more favorable.

Other Compound

In the present invention, the copolymer A may contain a further unit derived from "other compound" in addition to such unit derived from the compound represented by the general formula (1) or (2) and unit derived from the α,β-unsaturated hydrophobic compound (a2) as mentioned above within the limits not impeding the effect of the present invention. In such a case, a proportion of the unit derived from "other compound" is favorably 0% by mass or more and 40% by mass or less, more favorably 0% by mass or more and 20% by mass or less, based on the total mass of the copolymer A. The unit derived from "other compound" is particularly favorably substantially not contained. In the present invention, any of compounds having a polymerizable double bond may be used as "other compound". Specific examples of the other compound include unsaturated carboxylic acids such as (meth)acrylic acid, maleic acid, itaconic acid and fumaric acid, and derivatives and salts thereof; hydroxy alkyl (meth) acrylates such as hydroxymethyl (meth)acrylate, hydroxyethyl (meth)acrylate and hydroxypropyl (meth)acrylate; alkyl (meth)acrylamide compounds such as (meth)acrylamide, dimethyl (meth)acrylamide, N,N-dimethylethyl (meth) acrylamide, N,N-dimethylpropyl (meth)acrylamide, isopropyl (meth)acrylamide, diethyl (meth)acrylamide and (meth) acryloylmorpholine; and nitrogen-containing vinyl compounds such as N-vinylacetamide, N-vinylformamide, N-vinylpyridine, N-vinyl-pyrrolidone and N-vinylcarbazole. These compounds may be used either singly or in any combination thereof as needed.

(2) $\alpha,\beta$-Unsaturated Hydrophobic Compound (b)

The same compound as the $\alpha,\beta$-unsaturated hydrophobic compound mentioned above as the usable compound in the description of the compound (a2) may be used as the compound (b). Among the $\alpha,\beta$-unsaturated hydrophobic compounds, at least one selected from the aromatic vinyl compounds and the alkyl (meth)acrylates is favorable. At least one selected from styrene, stearyl (meth)acrylate and lauryl (meth)acrylate is more favorable. A compound of the same kind as the $\alpha,\beta$-unsaturated hydrophobic compound (2a) is particularly favorably used. The reason for this is that since compounds of the same kind are very high in compatibility with each other, the compound (b) is easily incorporated in the high hydrophobic site inside the copolymer A. As a result, the polymer particle can be stably formed. In addition, since the interaction between the shell portion and the core portion in the resulting polymer particle becomes very strong, the copolymer A becomes hard to be separated from the polymer particle. Incidentally, upon analysis of the resultant polymer particle, the $\alpha,\beta$-unsaturated hydrophobic compound (a2) in the copolymer A can be distinguished from the $\alpha,\beta$-unsaturated hydrophobic compound (b). This method will be described in "Analytic method of polymer particle" shown below.

In the present invention, a proportion (% by mass) of the unit derived from the compound (b) to the polymer particle is favorably 50.0% by mass or more and 90.0% by mass or less based on the total mass of the polymer particle, and a proportion (% by mass) of the copolymer A in the polymer particle is favorably 0.11 times or more and 0.43 times or less as much as the proportion (% by mass) of the unit derived from the compound (b). If the proportion is less than 0.11 times, the amount of the copolymer A contributing to the dispersion of the polymer particle and the reactivity with the liquid composition is too less, so that the effect to improve the ejection stability of the resulting ink and the blurring suppression of the resulting image may not be sufficiently achieved in some cases. If the proportion is more than 0.43 times, the amount of the unit derived from the compound (b) contributing to the water resistance of the resulting image is too less, so that the effect to improve the water resistance of the image may not be sufficiently achieved in some cases.

(3) Other Compound

In the present invention, the polymer particle may further contain a still further unit derived from "other compound" in addition to such unit derived from the compound represented by the general formula (1) or (2), unit derived from the $\alpha,\beta$-unsaturated hydrophobic compound (a2) and unit derived from the $\alpha,\beta$-unsaturated hydrophobic compound (b) as mentioned above within the limits not impeding the effect of the present invention. The same compound as the other compound mentioned above as the usable compound in the description of the copolymer A may be used as "other compound". In the present invention, a proportion of the unit derived from "other compound" to the polymer particle is favorably 0% by mass or more and 40% by mass or less, more favorably 0% by mass or more and 20% by mass or less, based on the total mass of the polymer particle. The unit derived from "other compound" is particularly favorably substantially not contained.

Synthesis Process of Polymer Particle Dispersion:
Synthesis Process of Copolymer A In the present invention, the copolymer A is obtained by copolymerizing the compound (a1) represented by the general formula (1) or (2) and the $\alpha,\beta$-unsaturated hydrophobic compound (a2). Any process heretofore generally used may be used as a synthesis process of the copolymer A. Specific examples thereof include a radical polymerization process, an anionic polymerization process, a living radical polymerization process and a living anionic polymerization process. Upon the polymerization, a polymerization initiator and a chain-transfer agent may also be used. Any of polymerization initiators and chain-transfer agents heretofore generally used may be used.

Synthesis Process of Polymer Particle

In the present invention, the polymer particle is obtained by further polymerizing the $\alpha,\beta$-unsaturated hydrophobic compound (b) in the presence of the copolymer A. Specifically, the polymer particle is obtained by a synthesis process having at least two steps of a dispersion step of dispersing the $\alpha,\beta$-unsaturated hydrophobic compound (b) with the copolymer A and a polymerization step of polymerizing the $\alpha,\beta$-unsaturated hydrophobic compound (b) dispersed with the copolymer A. The step of dispersing the compound (b) with the copolymer A is a step of mixing and stirring the copolymer A obtained above and the compound (b) to disperse the compound (b). Since the particle size of the polymer particle finally obtained is determined according to this step, a stirring method and stirring conditions are favorably adjusted according to a desired particle size. An ultrasonic dispersing device is favorably used as the stirring method. In that case, the frequency of an ultrasonic wave is favorably controlled to 20 kHz or more and 850 kHz or less, and the application time is favorably controlled to 1 minute or more and 60 minutes or less. The compound (b) dispersed in this manner is polymerized to obtain the polymer particle. Upon the polymerization, a polymerization initiator may also be used. Any of those heretofore generally used may be used as the polymerization initiator.

Analysis Method of Polymer Particle:

With respect to the composition and molecular weight of the resultant polymer particle, an analysis may be performed according to a conventionally known method. Even from a polymer particle dispersion or ink containing the polymer particle, an analysis may be performed by centrifuging the polymer particle dispersion or ink and examining a precipitate and a supernatant liquid thereof. Incidentally, the analysis may be conducted even in the state of the polymer particle dispersion or ink. However, the analysis can be performed with higher precision by separating the polymer particle. As a specific method thereof, the polymer particle dispersion or ink is centrifuged for 30 minutes at 10,000 rpm, and the polymer particle can be obtained from a supernatant liquid thereof.

A sample obtained by dissolving the polymer particle obtained in this manner in an organic solvent such as tetrahydrofuran (THF) can be separated into a shell portion and a core portion using GPC equipped with a differential refractive index detector. At this time, the kind of an organic solvent used as an eluent, and the kind and number of columns used in the separation are suitably changed, whereby a polymer of the core portion and a polymer of the shell portion in the polymer particle, said polymers being different from each other in molecular weight and composition, can be separated from each other. That is, after the eluent that has passed through the detector is taken out, respective components are dried to solids, whereby the polymer of the core portion and the polymer of the shell portion are obtained in a state of being separated from each other. In addition, the kinds and contents of compounds respectively constituting the polymers separated can be determined by pyrolysis gas chromatography/mass-spectrometer (GC/MS), nuclear magnetic resonance analysis ($^{13}$C-NMR) and/or Fourier transform infrared spectrophotometer (FT-IR). That is, whether the shell portion has the unit derived from the compound (a1) represented by the general formula (1) or (2) or the unit derived from the $\alpha,\beta$-unsaturated hydrophobic compound (a2), the proportions (% by mass) of the respective units to the copolymer A or whether the core portion has the unit derived from the $\alpha,\beta$-unsaturated hydrophobic compound (b) can be verified.

The weight average molecular weight and number average molecular weight of the polymers separated are obtained by GPC measurement. The procedure of the GPC measurement in the present invention is as follows. A sample for the GPC measurement is obtained by placing each polymer separated by the above-described method in THF, leaving the polymer at rest for several hours to dissolve the polymer, and then filtering the resultant solution through a solvent-resistant membrane filter (trade name: TITAN2 Syringe Filter PTFE; product of SUN-SRi) having a pour size of 0.45 µm. At this time, the content of the polymer particle in the sample is controlled to 0.1% by mass or more and 0.5% by mass or less. The resultant sample is used to conduct the measurement under the following conditions.
Apparatus: Alliance GPC 2695 (manufactured by Waters Co.)
Column: four-sequential columns of Shodex KF-806M (product of SHOWA DENKO K.K.)
Mobile phase: THF (analytical grade)
Flow rate: 1.0 mL/min
Oven temperature: 40.0° C.
Amount of sample solution injected: 0.1 mL
Detector: RI (refractive index)
Polystyrene standard sample: PS-1 and PS-2 (products of Polymer Laboratories Co.) (17 molecular weights: 7,500,000, 2,560,000, 841,700, 377,400, 320,000, 210,500, 148,000, 96,000, 59,500, 50,400, 28,500, 20,650, 10,850, 5,460, 2,930, 1,300 and 580).

The measurement was conducted under the above-described conditions also in Examples which will be described subsequently.
Coloring Material:

In the present invention, the coloring material used in the ink include a pigment and a dye. Any of those conventionally known may be used as the pigment and dye. In the present invention, the pigment is favorably used from the viewpoint of the water resistance of the resulting image. In the present invention, the coloring material may be either that reacting with the liquid composition or that not reacting with the liquid composition. However, that reacting with the liquid composition is favorable from the viewpoints of the blurring suppression and water resistance of the resulting image. Incidentally, in case of a pigment, the reactivity with the liquid composition can be controlled by the kind and amount of a functional group introduced into the surface of a pigment particle or the kind and amount of a polymer with which the pigment is dispersed. In case of a dye, the reactivity can be controlled by the kind and amount of a functional group in its structure. Specifically, a reactive dye may be favorably used.

The content (% by mass) of the coloring material is controlled to favorably 0.1% by mass or more and 15.0% by mass or less, more favorably 1.0% by mass or more and 10.0% by mass or less, based on the total mass of the ink. In addition, the content (% by mass) of the coloring material in the ink is favorably 0.1 times or more and 2.0 times or less, more favorably 0.1 times or more and 1.5 times or less, in terms of mass ratio with respect to the content (% by mass) of the polymer particle. If the content is less than 0.1 times, a sufficient optical density may not be achieved in the resulting image in some cases. If the content is more hand 1.5 times, the amount of the coloring material becomes larger as compared with the amount of the polymer pigment, so that the effect to improve the blurring suppression and water resistance of the resulting image may not be sufficiently achieved in some cases.

When the pigment is used as the coloring material in the present invention, examples of such a pigment include polymer-dispersed type pigments using a polymer as a dispersant (a polymer-dispersed pigment using a polymer dispersant, a microcapsule pigment with a surface of a pigment particle thereof covered with a polymer, and a polymer-bonded pigment with a polymer-containing organic group chemically bonded to a surface of a pigment particle thereof), and self-dispersion type pigments (self-dispersible pigments) with a hydrophilic group introduced into a surface of a pigment particle thereof. Quite naturally, pigments different in dispersing method may also be used in combination. Specifically, carbon black or an organic pigment is favorably used as the pigment. Only one kind of pigment may be used, or two or more kinds of pigment may be used in combination. When the pigment used in the ink is the polymer-dispersion type pigment, a polymer is used as a dispersant. The polymer used as the dispersant favorably has both hydrophilic site and hydrophobic site. Specific example thereof include acrylic polymers obtained by polymerizing a monomer having a carboxyl group, such as acrylic acid or methacrylic acid; and urethane polymers obtained by polymerizing a diol having an anionic group, such as dimethylol propionic acid. The acid value of the polymer used as the dispersant is favorably 50 mg KOH/g or more and 300 mg KOH/g or less. The weight average molecular weight (Mw), in terms of polystyrene, of the polymer used as the dispersant as determined by GPC is favorably 1,000 or more and 15,000 or less. The content (% by mass) of the polymer dispersant in the ink is favorably 0.1% by mass or more and 10.0% by mass or less, more favorably 0.2% by mass or more and 4.0% by mass or less based on the total mass of the ink. In addition, the content (% by mass) of the polymer dispersant is favorably 0.1 time or more and 1.0 time or less in terms of mass ratio with respect to the content (% by mass) of the pigment.
Aqueous Medium:

In the present invention, the ink may use an aqueous medium that is water or a mixed solvent of water and a water-soluble organic solvent. The content (% by mass) of the water-soluble organic solvent in the ink is favorably 3.0% by mass or more and 50.0% by mass or less based on the total mass of the ink. As the water-soluble organic solvent, may be used any of water-soluble organic solvents heretofore generally used. Examples thereof include alcohols, glycols, alkylene glycols the alkylene group of which has 2 to 6 carbon atoms, polyethylene glycols, nitrogen-containing compounds, and sulfur-containing compounds. These water-soluble organic solvents may be used either singly or in any combination thereof as needed. Deionized water (ion-exchanged water) is favorably used as water. The content (% by mass) of water in the ink is favorably 50.0% by mass or more and 95.0% by mass or less based on the total mass of the ink.

Other Components:

In the present invention, the ink may contain a water-soluble organic compound that is solid at ordinary temperature, such as a polyhydric alcohol such as trimethylolpropane or trimethylolethane, urea, or a urea derivative such as ethyleneurea in addition to the above-described components, as needed. Further, in the present invention, the ink may contain various additives such as a surfactant, a pH adjustor, a rust preventive, a preservative, a mildewproofing agent, an antioxidant, an anti-reducing agent, an evaporation accelerator, a chelating agent and a polymer as needed.

<2> Liquid Composition:

The liquid composition used in the present invention destabilizes the dispersion state of the polymer particle in the ink. In the present invention, "the liquid composition destabilizing the dispersion state of the polymer particle in the ink" means a liquid composition that a ratio of $D_B$ to $D_A$, ($D_B/D_A$), is 1.3 or more upon the following determination method. The determination method is as follows. First, a solution A containing the polymer particle at the same concentration as that in the ink used in combination with the liquid composition and containing no coloring material is prepared. With respect to this solution A, a volume average particle size $D_{50}$ of the polymer particle is measured under conditions of a refractive index of a sample of 1.5, a refractive index of a dispersion medium (water) of 1.333 and a repetition number of 15, by means of a laser diffraction/scattering particle size distribution meter LA-950V2 (manufactured by Horiba Ltd.), and this value is regarded as $D_A$. Then, a mixed solution B is prepared by mixing the solution A with a liquid composition that is in an amount of 0.5 times in terms of mass ratio with respect to the solution A. With respect to this mixed solution B, $D_{50}$ is measured in the same manner as described above, and this value is regarded as $D_B$. At this time, when the ratio of $D_B$ to $D_A$, ($D_B/D_A$), is 1.3 or more, it is determined that "liquid composition has destabilized the dispersion state of the polymer particle in the ink".

In the present invention, the liquid composition is favorably colorless, semitranslucent or white from the viewpoint of not affecting an image recorded with the ink. Therefore, a ratio of the maximum absorbance to the minimum absorbance (maximum absorbance/minimum absorbance) in a wave range of from 400 nm to 800 nm, which is a wave range of visible light, is favorably 1.0 or more and 2.0 or less. This means that a peak of the absorbance is substantially not included in the wave range of the visible light, or the intensity of the peak is extremely small if included. In addition, in the present invention, the liquid composition does favorably not contain a coloring material. In Examples of the present invention which will be described later, the absorbance was measured by means of Hitachi Double Beam Spectrophotometer U-2900 (manufactured by Hitachi High-Technologies Corporation) by using a liquid composition which was not diluted. At this time, the liquid composition may be diluted to measure the absorbance. This is because since the values of the maximum absorbance and minimum absorbance of the liquid composition are both proportional to a dilution rate, a value of the ratio of the maximum absorbance (maximum absorbance/minimum absorbance) to the minimum absorbance does not depend on the dilution rate.

Respective components constituting the liquid composition used in the image recording method and the set of the ink and the liquid composition according to the present invention will hereinafter be respectively described.

Reaction Agent:

The liquid composition used in the present invention favorably contains such a reaction agent as to destabilize the dispersion state of the polymer particle in the ink. Any reaction agent heretofore generally used in the two-liquid reaction system may be used as such a reaction agent. Specific examples thereof include polyvalent metal ions and organic acids. The content (% by mass) of the reaction agent in the liquid composition is favorably 3.0% by mass or more and 20.0% by mass or less based on the total mass of the liquid composition. If the content is less than 3.0% by mass, the effect to destabilize the dispersion of the polymer particle becomes weak, so that the effect to improve the blurring suppression and water resistance of the image may be not sufficiently achieved in some cases. If the content is more than 20.0% by mass, the reaction agent may be deposited in some cases.

Polyvalent Metal Ion

In the present invention, the polyvalent metal ion used in the liquid composition includes divalent or higher-valent metal ions. Examples of divalent metal ions include ions of alkaline earth metals such as beryllium, magnesium, calcium, strontium, barium and radium, and examples of trivalent or higher-valent metal ions include ions of aluminum, yttrium, zirconium, iron and other transition metals. In the present invention, the polyvalent metal ion may be added in the form of a hydroxide or a salt such as a chloride or nitrate into the liquid composition to use an ion produced by dissociation.

In the present invention, at least one selected from a calcium ion, an aluminum ion and an yttrium ion is favorably used from the viewpoint of reactivity. A calcium ion is more favorably used. Such an ion is favorably added in the form of a nitrate from the viewpoint of the solubility of the salt. As an example thereof, may be mentioned calcium nitrate.

Organic Acid

In the present invention, "organic acid" means an acid among organic compounds. Examples of the organic acid used in the liquid composition include monocarboxylic acids such as formic acid, acetic acid, propionic acid and butyric acid; dicarboxylic acids such as oxalic acid, malonic acid, succinic acid and glutaric acid; hydroxycarboxylic acids (organic acids having a hydroxyl group and a carboxyl group) such as malic acid, tartaric acid and citric acid; keto acids (organic acids having a ketone group and a carboxyl group) such as levulinic acid; acidic amino acids such as glutamic acid; and organic sulfonic acids such as methanesulfonic acid and 2-morpholino-ethanesulfonic acid. In the present invention, the organic acid may be added in the form of a salt with an alkali metal ion into the liquid composition to use an ion produced by dissociation.

When the organic acid is used as the reaction agent, the pH of the liquid composition is favorably 3.5 or more and 5.5 or less. If the pH of the liquid composition is less than 3.5, acid corrosion may occur in members used in an image forming apparatus in some cases. If the pH is more than 5.5, the effect to improve the blurring suppression and water resistance of the image may be not sufficiently achieved in some cases. Incidentally, the pH of the liquid composition is a value at 25° C. and can be measured by means of a general pH meter. In addition, when the organic acid is used as the reaction agent, the liquid composition favorably has a pH buffering action. In the present invention, the condition that "a liquid composition has a pH buffer action" means that a pH when the liquid composition and the ink are mixed in equal amounts does not substantially change from the pH of the liquid composition. Regarding this condition that a pH does not substantially change from the pH of the liquid composition, it is favorable that the pH change is specifically within 0.1.

Aqueous Medium and Other Components:

In the present invention, the liquid composition may use an aqueous medium that is water or a mixed solvent of water and a water-soluble organic solvent. The content (% by mass) of the water-soluble organic solvent in the liquid composition is favorably 3.0% by mass or more and 50.0% by mass or less, more favorably 3.0% by mass or more and 40.0% by mass or less, based on the total mass of the liquid composition. The same water-soluble organic solvent as that mentioned above as the usable water-soluble organic solvent in the ink may be used as the water-soluble organic solvent. Deionized water (ion-exchanged water) is favorably used as water. The content (% by mass) of water in the liquid composition is favorably 50.0% by mass or more and 95.0% by mass or less based on the total mass of the liquid composition. In the present invention, the same other components as those mentioned above as the usable other components in the ink may be used.

The present invention will hereinafter be described in more detail by the following Examples and Comparative Examples. However, the present invention is not limited by the following examples unless going beyond the gist of the present invention. Incidentally, all designations of "part" or "parts" described in the following examples are based on mass unless expressly noted. Incidentally, abbreviations in the specification and the following Tables are as follows.

PEGMA: Polyethylene glycol methacrylate
SMA: Stearyl methacrylate
LMA: Lauryl methacrylate
EMA: Ethyl methacrylate
AA: Acrylic acid
MAA Methacrylic acid
St: Styrene.

Synthesis of Polymer Particle:

Synthesis of Compound 1-1:

Synthesis of Compound a1

Compound a1, $H_2C=C(CH_3)(C_2H_4O)_{60}-C_2H_4OCO-C_2H_4-COOH$, was synthesized by an esterification reaction of PEGMA ($R_1$ in the general formula (3) is a methacryloyl group, and n is 61) with succinic anhydride.

Synthesis of Compound a2

Compound a2, $H_2C=C(CH_3)(C_2H_4O)_5-C_2H_4OCO-C_2H_4-COOH$, was synthesized in the same manner as described above except that PEGMA that n=6 was used.

Synthesis of Compound a3

Compound a3: $H_2C=C(CH_3)(C_2H_4O)_{10}-C_2H_4OCO-C_2H_4-COOH$ was synthesized in the same manner as described above except that PEGMA with n=11 was used.

Synthesis of Compound a4

Compound a4, $H_2C=C(CH_3)(C_2H_4O)_{100}-C_2H_4OCO-C_2H_4-COOH$, was synthesized in the same manner as described above except that PEGMA with n=101 was used.

Synthesis of Compound a5

Compound a5, $H_2C=C(CH_3)(C_2H_4O)_{120}-C_2H_4OCO-C_2H_4-COOH$, was synthesized in the same manner as described above except that PEGMA with n=121 was used.

Synthesis of Compound a6

Compound a6, $H_2C=C(CH_3)(C_2H_4O)_{60}-C_2H_4OCO-Ph-COOH$, (Ph is a phenylene group) was synthesized by an esterification reaction of PEGMA ($R_1$ in the general formula (3) is a methacryloyl group, and n is 61) with phthalic anhydride.

Synthesis of Compound a7

Compound a7, $H_2C=C(CH_3)(C_2H_4O)_{60}-C_2H_4OCO-CH_2COOH$, was synthesized from PEGMA ($R_1$ in the general formula (3) is a methacryloyl group, and n is 61) and sodium monochloroacetate.

Synthesis of Polymer S:

Polymer S having Compound 1-1 obtained above, and Compounds 1-2 and/or 1-3 shown in Table 1 as constituent components was synthesized. The weight average molecular weight of the resultant Polymer S was measured according to the method described above. Results obtained are shown in Table 1.

TABLE 1

Composition and properties of Polymer S

| | Compound 1-1 | | | Compound 1-2 | | Compound 1-3 | | Properties | |
|---|---|---|---|---|---|---|---|---|---|
| Polymer S | Kind | n | Proportion*1 (% by mass) | Kind | Proportion*2 (% by mass) | Kind | Proportion*3 (% by mass) | Form of polymer | Mw of Polymer S |
| S1 | Compound a1 | 60 | 70.0 | SMA | 30.0 | — | — | Random copolymer | 140000 |
| S2 | Compound a2 | 5 | 70.0 | SMA | 30.0 | — | — | Random copolymer | 100000 |
| S3 | Compound a3 | 10 | 70.0 | SMA | 30.0 | — | — | Random copolymer | 120000 |
| S4 | Compound a4 | 100 | 70.0 | SMA | 30.0 | — | — | Random copolymer | 160000 |
| S5 | Compound a5 | 120 | 70.0 | SMA | 30.0 | — | — | Random copolymer | 160000 |
| S6 | Compound a6 | 60 | 70.0 | SMA | 30.0 | — | — | Random copolymer | 150000 |
| S7 | Compound a7 | 60 | 70.0 | SMA | 30.0 | — | — | Random copolymer | 140000 |
| S8 | Compound a1 | 60 | 70.0 | LMA | 30.0 | — | — | Random copolymer | 140000 |

TABLE 1-continued

Composition and properties of Polymer S

| | Compound 1-1 | | | Compound 1-2 | | Compound 1-3 | | | Properties |
| --- | --- | --- | --- | --- | --- | --- | --- | --- | --- |
| Polymer S | Kind | n | Proportion*1 (% by mass) | Kind | Proportion*2 (% by mass) | Kind | Proportion*3 (% by mass) | Form of polymer | Mw of Polymer S |
| S9 | Compound a1 | 60 | 70.0 | St | 30.0 | — | — | Random copolymer | 130000 |
| S10 | AA | — | 70.0 | SMA | 30.0 | — | — | Random copolymer | 90000 |
| S11 | Compound a1 | 60 | 40.0 | SMA | 60.0 | — | — | Random copolymer | 100000 |
| S12 | Compound a1 | 60 | 50.0 | SMA | 50.0 | — | — | Random copolymer | 120000 |
| S13 | Compound a1 | 60 | 90.0 | SMA | 10.0 | — | — | Random copolymer | 120000 |
| S14 | Compound a1 | 60 | 95.0 | SMA | 5.0 | — | — | Random copolymer | 160000 |
| S15 | Compound a1 | 60 | 70.0 | SMA | 30.0 | MAA | 10.0 | Random copolymer | 110000 |
| S16 | Compound a1 | 60 | 70.0 | SMA | 30.0 | — | — | Block copolymer | 80000 |

*1Proportion of unit derived from Compound 1-1 to Polymer S;
*2Proportion of unit derived from Compound 1-2 to Polymer S;
*3Proportion of unit derived from Compound 1-3 to Polymer S.

Synthesis of Polymer Particle Dispersion:

Polymer S and Compound 2 shown in Table 2 were mixed in respective amounts (parts) shown in Table 2, 0.5 part of 2,2-azobis-(2-methylbutyronitrile), which is a polymerization initiator, was added, and the resultant mixture was stirred for 15 minutes at 100 rpm by a magnetic stirrer to obtain a solution. Then, 100 parts of this solution was added to 250 parts of water, and the resultant mixture was adjusted to pH 8.0 with an aqueous solution of sodium hydroxide. After this mixture was emulsified under conditions of 20 kHz and 60 minutes by means of an ultrasonic wave application machine S-150D Digital Sonifier (manufactured by Branson Co.), a polymerization reaction was conducted for 8 hours at 70° C. under a nitrogen atmosphere. The resultant reaction mixture was filtered through Mini Sarto 17594K (product of Sartorius Co.) having a pore size of 5.0 μm to obtain a polymer particle dispersion with a content of the polymer particle of 25.0% by mass. With respect to the resultant polymer particle dispersion, the 50% cumulative volume average particle size ($D_{50}$) of the polymer particle, proportions of respective units derived from Compound 2 and Polymer S in the polymer particle and the surface functional group density of the polymer particle were measured according to the methods described above. Results thus obtained are shown in Table 2.

TABLE 2

Composition and properties of polymer particle dispersion

| | Amount of raw material added | | | | Composition of polymer particle dispersion | | | Properties of polymer particle | |
| --- | --- | --- | --- | --- | --- | --- | --- | --- | --- |
| | Polymer s | | Compound 2 | | | | | Average | Surface functional |
| Resin particle dispersion | Kind | Amount added (parts) | Kind | Amount added (parts) | Polymer S Proportion*4 (% by mass) | Compound 2 Proportion*5 (% by mass) | Proportion*6 (times) | particle size $D_{50}$ (nm) | group density (μmol/g) |
| P1 | S1 | 20.0 | EMA | 80.0 | 20.0 | 80.0 | 0.25 | 220 | 50 |
| P2 | S2 | 20.0 | EMA | 80.0 | 20.0 | 80.0 | 0.25 | 150 | 370 |
| P3 | S3 | 20.0 | EMA | 80.0 | 20.0 | 80.0 | 0.25 | 170 | 230 |
| P4 | S4 | 20.0 | EMA | 80.0 | 20.0 | 80.0 | 0.25 | 200 | 30 |
| P5 | S5 | 20.0 | EMA | 80.0 | 20.0 | 80.0 | 0.25 | 230 | 25 |
| P6 | S6 | 20.0 | EMA | 80.0 | 20.0 | 80.0 | 0.25 | 200 | 50 |
| P7 | S7 | 20.0 | EMA | 80.0 | 20.0 | 80.0 | 0.25 | 210 | 50 |
| P8 | S8 | 20.0 | EMA | 80.0 | 20.0 | 80.0 | 0.25 | 210 | 50 |
| P9 | S9 | 20.0 | EMA | 80.0 | 20.0 | 80.0 | 0.25 | 210 | 50 |
| P10 | S10 | 20.0 | EMA | 80.0 | 20.0 | 80.0 | 0.25 | 130 | 1000 |
| P11 | S11 | 20.0 | EMA | 80.0 | 20.0 | 80.0 | 0.25 | 220 | 29 |
| P12 | S12 | 20.0 | EMA | 80.0 | 20.0 | 80.0 | 0.25 | 200 | 35 |
| P13 | S13 | 20.0 | EMA | 80.0 | 20.0 | 80.0 | 0.25 | 220 | 65 |
| P14 | S14 | 20.0 | EMA | 80.0 | 20.0 | 80.0 | 0.25 | 230 | 65 |
| P15 | S15 | 20.0 | EMA | 80.0 | 20.0 | 80.0 | 0.25 | 220 | 50 |
| P16 | S16 | 20.0 | EMA | 80.0 | 20.0 | 80.0 | 0.25 | 200 | 50 |
| P17 | S1 | 20.0 | St | 80.0 | 20.0 | 80.0 | 0.25 | 210 | 50 |
| P18 | S1 | 20.0 | SMA | 80.0 | 20.0 | 80.0 | 0.25 | 230 | 50 |

TABLE 2-continued

Composition and properties of polymer particle dispersion

| | Amount of raw material added | | | | Composition of polymer particle dispersion | | | Properties of polymer particle | |
|---|---|---|---|---|---|---|---|---|---|
| | Polymer s | | Compound 2 | | | | | Average | Surface functional |
| Resin particle dispersion | Kind | Amount added (parts) | Kind | Amount added (parts) | Polymer S Proportion*4 (% by mass) | Compound 2 Proportion*5 (% by mass) | Proportion*6 (times) | particle size D$_{50}$ (nm) | group density (μmol/g) |
| P19 | S1 | 9.0 | EMA | 92.0 | 9.0 | 91.0 | 0.10 | 260 | 20 |
| P20 | S1 | 10.0 | EMA | 91.0 | 10.0 | 90.0 | 0.11 | 240 | 25 |
| P21 | S1 | 30.0 | EMA | 71.0 | 30.0 | 70.0 | 0.43 | 180 | 75 |
| P22 | S1 | 50.0 | EMA | 51.0 | 50.0 | 50.0 | 0.50 | 180 | 125 |

*4Proportion of unit derived from Polymer S to the polymer particle;
*5Proportion of unit derived from Compound 2 to the polymer particle;
*6Proportion of the unit derived from Polymer S/proportion of the unit derived from Compound 2.

Preparation of Pigment Dispersion:
Pigment Dispersion A

A polymer-dispersed carbon black dispersion was prepared by using, as a polymer dispersant, a benzyl methacrylate-methacrylic acid copolymer having an acid value of 130 mg KOH/g and a weight average molecular weight of 7,000 and was referred to as Pigment Dispersion A. The content of the pigment in the resultant Pigment Dispersion A was 20.0% by mass, the content of the polymer was 5.0% by mass, and the volume average particle size of the pigment was 130 nm.

Preparation of Pigment Dispersion B

Cab-O-Jet 200 (product of Cabot), which is self-dispersible carbon black with a sulfophenyl group bonded to the surface of the carbon black, was used as Pigment Dispersion B (content of the pigment: 20.0% by mass). The volume average particle size of the pigment was 135 nm.

Preparation of Aqueous Dye Solution:

C.I. Direct Black 195 was used to prepare an aqueous dye solution in which the content of the dye was 20.0% by mass.

Preparation of Ink:

After the polymer particle dispersion and pigment dispersion or aqueous dye solution obtained above were used, and mixed according to their corresponding compositions shown in Table 3 and sufficiently stirred and dispersed, the respective mixtures were filtered under pressure through a microfilter (product of Fuji Photo Film Co., Ltd.) having a pore size of 3.0 μm to prepare respective inks.

TABLE 3

Composition and properties of ink

| Ink | Pigment dispersion or aqueous dye solution*7 Kind | Content (% by mass) | Resin particle dispersion*8 Kind | Content (% by mass) | Glycerol (% by mass) | 2-Pyrrolidone (% by mass) | Polyethylene glycol*9 (% by mass) | Acetylenol E100*10 (% by mass) | Ion-exchanged water (% by mass) | Content of coloring material in ink (% by mass) | Content of polymer particle in ink (% by mass) | Content of coloring material/ content of polymer particle in ink (times) |
|---|---|---|---|---|---|---|---|---|---|---|---|---|
| 1 | A | 13.3 | P1 | 64.0 | 5.0 | 5.0 | 5.0 | 1.0 | 6.7 | 2.7 | 16.0 | 0.2 |
| 2 | A | 13.3 | P2 | 64.0 | 5.0 | 5.0 | 5.0 | 1.0 | 6.7 | 2.7 | 16.0 | 0.2 |
| 3 | A | 13.3 | P3 | 64.0 | 5.0 | 5.0 | 5.0 | 1.0 | 6.7 | 2.7 | 16.0 | 0.2 |
| 4 | A | 13.3 | P4 | 64.0 | 5.0 | 5.0 | 5.0 | 1.0 | 6.7 | 2.7 | 16.0 | 0.2 |
| 5 | A | 13.3 | P5 | 64.0 | 5.0 | 5.0 | 5.0 | 1.0 | 6.7 | 2.7 | 16.0 | 0.2 |
| 6 | A | 13.3 | P6 | 64.0 | 5.0 | 5.0 | 5.0 | 1.0 | 6.7 | 2.7 | 16.0 | 0.2 |
| 7 | A | 13.3 | P7 | 64.0 | 5.0 | 5.0 | 5.0 | 1.0 | 6.7 | 2.7 | 16.0 | 0.2 |
| 8 | A | 13.3 | P8 | 64.0 | 5.0 | 5.0 | 5.0 | 1.0 | 6.7 | 2.7 | 16.0 | 0.2 |
| 9 | A | 13.3 | P9 | 64.0 | 5.0 | 5.0 | 5.0 | 1.0 | 6.7 | 2.7 | 16.0 | 0.2 |
| 10 | A | 13.3 | P10 | 64.0 | 5.0 | 5.0 | 5.0 | 1.0 | 6.7 | 2.7 | 16.0 | 0.2 |
| 11 | A | 13.3 | P11 | 64.0 | 5.0 | 5.0 | 5.0 | 1.0 | 6.7 | 2.7 | 16.0 | 0.2 |
| 12 | A | 13.3 | P12 | 64.0 | 5.0 | 5.0 | 5.0 | 1.0 | 6.7 | 2.7 | 16.0 | 0.2 |
| 13 | A | 13.3 | P13 | 64.0 | 5.0 | 5.0 | 5.0 | 1.0 | 6.7 | 2.7 | 16.0 | 0.2 |
| 14 | A | 13.3 | P14 | 64.0 | 5.0 | 5.0 | 5.0 | 1.0 | 6.7 | 2.7 | 16.0 | 0.2 |
| 15 | A | 13.3 | P15 | 64.0 | 5.0 | 5.0 | 5.0 | 1.0 | 6.7 | 2.7 | 16.0 | 0.2 |
| 16 | A | 13.3 | P16 | 64.0 | 5.0 | 5.0 | 5.0 | 1.0 | 6.7 | 2.7 | 16.0 | 0.2 |
| 17 | A | 13.3 | P17 | 64.0 | 5.0 | 5.0 | 5.0 | 1.0 | 6.7 | 2.7 | 16.0 | 0.2 |
| 18 | A | 13.3 | P18 | 64.0 | 5.0 | 5.0 | 5.0 | 1.0 | 6.7 | 2.7 | 16.0 | 0.2 |
| 19 | A | 13.3 | P19 | 64.0 | 5.0 | 5.0 | 5.0 | 1.0 | 6.7 | 2.7 | 16.0 | 0.2 |
| 20 | A | 13.3 | P20 | 64.0 | 5.0 | 5.0 | 5.0 | 1.0 | 6.7 | 2.7 | 16.0 | 0.2 |
| 21 | A | 13.3 | P21 | 64.0 | 5.0 | 5.0 | 5.0 | 1.0 | 6.7 | 2.7 | 16.0 | 0.2 |
| 22 | A | 13.3 | P22 | 64.0 | 5.0 | 5.0 | 5.0 | 1.0 | 6.7 | 2.7 | 16.0 | 0.2 |
| 23 | A | 13.3 | P1 | 12.0 | 5.0 | 5.0 | 5.0 | 1.0 | 58.7 | 2.7 | 3.0 | 0.9 |
| 24 | A | 23.0 | P1 | 11.5 | 5.0 | 5.0 | 5.0 | 1.0 | 49.5 | 4.6 | 2.9 | 1.6 |

TABLE 3-continued

Composition and properties of ink

| Ink | Pigment dispersion or aqueous dye solution*[7] Kind | Pigment dispersion or aqueous dye solution*[7] Content (% by mass) | Resin particle dispersion*[8] Kind | Resin particle dispersion*[8] Content (% by mass) | Glycerol (% by mass) | 2-Pyrrolidone (% by mass) | Polyethylene glycol*[9] (% by mass) | Acetylenol E100*[10] (% by mass) | Ion-exchanged water (% by mass) | Content of coloring material in ink (% by mass) | Content of polymer particle in ink (% by mass) | Content of coloring material/content of polymer particle in ink (times) |
|---|---|---|---|---|---|---|---|---|---|---|---|---|
| 25 | B | 13.3 | P1 | 64.0 | 5.0 | 5.0 | 5.0 | 1.0 | 6.7 | 2.7 | 16.0 | 0.2 |
| 26 | *11 | 13.3 | P1 | 64.0 | 5.0 | 5.0 | 5.0 | 1.0 | 6.7 | 2.7 | 16.0 | 0.2 |

*[7]The content of the coloring material was 20.0% by mass in each case.
*[8]The content of the polymer particle was 25.0% by mass.
*[9]Polyethylene glycol (number average molecular weight: 1,000).
*[10]Acetylenol E100 (surfactant produced by Kawaken Fine Chemicals Co., Ltd.).
*[11]Aqueous dye solution.

Preparation of Liquid Composition:
Preparation of Liquid Composition 1:

The following respective components were mixed. Incidentally, "Balance" in ion-exchanged water means such an amount that the total amount of all the components constituting the liquid composition becomes 100.0% by mass.

| | |
|---|---|
| Reaction agent: calcium nitrate | 5.0% by mass |
| Glycerol | 5.0% by mass |
| 1,5-Pentanediol | 5.0% by mass |
| Trimethylene glycol | 5.0% by mass |
| Acetylenol E100 (surfactant, product of Kawaken Fine Chemicals Co., Ltd.) | 0.1% by mass |
| Ion-exchanged water | Balance. |

This mixture was sufficiently stirred and dispersed and then filtered under pressure through a microfilter (product of Fuji Photo Film Co., Ltd.) having a pore size of 3.0 μm to prepare Liquid Composition 1.

Preparation of Liquid Composition 2:

The following respective components were mixed. Incidentally, "Balance2 in ion-exchanged water means such an amount that the total amount of all the components constituting the liquid composition becomes 100.0% by mass.

| | |
|---|---|
| Reaction agent: trisodium citrate | 10.0% by mass |
| Glycerol | 5.0% by mass |
| 1,5-Pentanediol | 5.0% by mass |
| Trimethylolpropane | 7.0% by mass |
| NIKKOL BC-20 (surfactant, product of NIKKO CHEMICALS CO., LTD.) | 1.0% by mass |
| Ion-exchanged water | Balance. |

This mixture was sufficiently stirred and dispersed and then filtered under pressure through a microfilter (product of Fuji Photo Film Co., Ltd.) having a pore size of 3.0 μm. In addition, the mixture was adjusted to pH 4.0 with sulfuric acid to prepare Liquid Composition 2.

Confirming Whether Dispersion State of Polymer Particle in Ink is Destabilized with Liquid Composition or not:

With respect to all sets of the ink and the liquid composition, a ratio of $D_B$ to $D_A$, ($D_B/D_A$), was calculated according to the method described above. As a result, $D_B/D_A$ was 1.3 or more in any of the sets, and so the dispersion state of the polymer particle in each ink was destabilized with the liquid composition.

Evaluation of Ink:
Ejection Stability of Ink

An ink cartridge charged with each of the inks obtained above was installed in an ink jet recording apparatus (trade name "PIXUS iP3100", manufactured by Canon Inc.), and a solid image (image of recording duty 100%) of 19 cm×26 cm was printed on ten A4-sized PPC paper sheets (GF-500, trade name, product of Canon Inc.). At this time, the solid images printed on the fifth paper sheet and tenth paper sheet were visually observed, thereby evaluating the ejection stability of the ink. Incidentally, recording conditions were as follows: temperature: 23° C. and relative humidity: 55%. In the above-described ink jet recording apparatus, an image recorded under the conditions where one ink droplet of about 28 ng is applied to a unit region (1 pixel) of 1/600 in ×1/600 in with a resolution of 600 dpi×600 dpi is defined as an image of a recording duty of 100%. The evaluation criteria of the ejection stability of the ink are as follows. In the following evaluation criteria, "A" and "B" were regarded as an acceptable level, and "C" was regarded as an unacceptable level. Evaluation results are shown in Table 4.

A: Neither white stripes nor blur was observed in the solid images on the fifth and tenth paper sheets;
B: Neither white stripes nor blur was observed in the solid image on the fifth paper sheet, but white stripes and blur were slightly observed in the solid image on the tenth paper sheet, which was an almost inconspicuous level;
C: White stripes and blur were observed in the solid images on the fifth and tenth paper sheets.

Evaluation of Image:

The following evaluations of "Water resistance" and "Blurring suppression of image" were made by means of an ink jet recording apparatus PIXUS Pro9500 (trade name; manufactured by Canon Inc.). The inks and liquid compositions obtained above were charged into ink cartridges in combination to obtain the sets shown in Table 4 and installed in the ink jet recording apparatus PIXUS Pro9500. At this time, the ink was installed at a position of yellow, and the liquid composition was installed at a position of gray. The recording method was a one-scan one-way recording method in which a recording operation for a nozzle width of a recording head is conducted only at scanning from a home position to the opposite position of the width. The liquid composition was applied by the same pass, and the ink was then applied to the same region so as to overlap therewith, thereby obtaining an image. A solid image (image in which recording duties of the ink and liquid composition were both 100%) of 19 cm×26 cm was printed on an A4-sized PPC paper sheet (GF-500, trade name, product of Canon Inc.). Incidentally, the recording conditions were as follows: temperature: 23° C. and relative humidity: 55%. In the above-described ink jet recording apparatus, an image recorded under the conditions where one ink droplet of about 16 ng is applied to a unit region (1 pixel) of 1/600 in × 1/600 in with a resolution of 600 dpi×600 dpi is defined as an image of an ink recording duty of 100%. In addition, an image recorded under the conditions where one liquid composition droplet of about 7 ng is applied to said 1 pixel is defined as an image of a recording duty of the liquid composition of 100%. In the following respective evaluation criteria, "A" and "B" were regarded as an acceptable level, and "C" was regarded as an unacceptable level.

Water Resistance of Image:

One droplet of pure water was dropped on the image obtained above by a dropping pipette. After 1 minute, a wiping paper towel, Kimwipe S-200 (trade name; product of CLECIA), was pressed against a region on which the pure water had been dropped from the above followed by being left to stand for 1 minute. Thereafter, the Kimwipe was softly separated in a direction perpendicular to the image. The conditions of the region of the image on which the pure water had been dropped and the Kimwipe were visually observed, thereby evaluating the water resistance of the image. The evaluation standard of the water resistance of the image is as follows. Evaluation results are shown in Table 4.
A: No color change was observed in the image, and no adhesion of the ink to Kimwipe was observed;
B: No color change was observed in the image, but adhesion of the ink to Kimwipe was slightly observed;
C: Color change was observed in the image, and adhesion of the ink to Kimwipe was also observed.

Blurring Suppression of Image:

The outline of the image obtained above visually observed, thereby evaluating the blurring suppression of the image. The evaluation criteria of the blurring suppression of the image are as follows. Evaluation results are shown in Table 4.
A: The outline of the image is not blurred;
B: The outline of the image is scarcely blurred;
C: The outline of the image is blurred.

TABLE 4

Combination of ink and liquid composition and Evaluation results

| Example | Ink | Liquid composition | Evaluation of ink Ejection stability of ink | Evaluation of image Water resistance of image | Blurring suppression of image |
|---|---|---|---|---|---|
| Ex. 1 | Ink 1 | Composition 1 | A | A | A |
| Ex. 2 | Ink 3 | Composition 1 | A | A | A |
| Ex. 3 | Ink 4 | Composition 1 | A | A | A |
| Ex. 4 | Ink 6 | Composition 1 | A | A | A |
| Ex. 5 | Ink 7 | Composition 1 | A | A | A |
| Ex. 6 | Ink 8 | Composition 1 | A | A | A |
| Ex. 7 | Ink 9 | Composition 1 | A | A | A |
| Ex. 8 | Ink 12 | Composition 1 | A | A | A |
| Ex. 9 | Ink 13 | Composition 1 | A | A | A |
| Ex. 10 | Ink 15 | Composition 1 | A | A | A |
| Ex. 11 | Ink 16 | Composition 1 | A | A | A |
| Ex. 12 | Ink 17 | Composition 1 | A | A | A |
| Ex. 13 | Ink 18 | Composition 1 | A | A | A |
| Ex. 14 | Ink 19 | Composition 1 | B | A | B |
| Ex. 15 | Ink 20 | Composition 1 | A | A | A |
| Ex. 16 | Ink 21 | Composition 1 | A | A | A |
| Ex. 17 | Ink 22 | Composition 1 | A | B | A |
| Ex. 18 | Ink 23 | Composition 1 | A | A | A |
| Ex. 19 | Ink 24 | Composition 1 | A | B | A |
| Ex. 20 | Ink 25 | Composition 1 | A | A | A |
| Ex. 21 | Ink 26 | Composition 1 | A | B | A |
| Ex. 22 | Ink 1 | Composition 2 | A | A | A |
| Comp. Ex. 1 | Ink 2 | Composition 1 | C | B | B |
| Comp. Ex. 2 | Ink 5 | Composition 1 | C | B | B |
| Comp. Ex. 3 | Ink 10 | Composition 1 | A | C | B |
| Comp. Ex. 4 | Ink 11 | Composition 1 | C | A | A |
| Comp. Ex. 5 | Ink 14 | Composition 1 | C | A | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264878, filed Dec. 2, 2011, which is hereby incorporated by reference herein in its entirety.

What is claimed is:

1. An image recording method comprising applying an ink containing a coloring material and a polymer particle to a recording medium from a recording head of an ink jet system and applying a liquid composition which destabilizes a dispersion state of the polymer particle in the ink to at least a part of a region of the recording medium where the ink is applied, wherein
the polymer particle in the ink has a core portion and a shell portion,
the shell portion contains a copolymer A having a unit derived from a compound (a1) represented by a general formula (1) of $R_1$—$(C_2H_4O)_n$—$C_2H_4OCO$—$R_2$—COOH where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less or a general formula (2) of $R_1$—$(C_2H_4O)_n$—$C_2H_4O$—$R_2$—COOH where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less and having a unit derived from an α,β-unsaturated hydrophobic compound (a2),
a proportion of the unit derived from the compound (a1) to the copolymer A is 50% by mass or more and 90% by mass or less,
a proportion of the unit derived from the compound (a2) to the copolymer A is 10% by mass or more and 50% by mass or less, and
the core portion contains a polymer of an α,β-unsaturated hydrophobic compound (b).

2. The image recording method according to claim 1, wherein the polymer particle is obtained by further polymerizing the α,β-unsaturated hydrophobic compound (b) in the presence of the copolymer A.

3. The image recording method according to claim 1, wherein the polymer particle is obtained by a synthesis process including a dispersion step of dispersing the α,β-unsaturated hydrophobic compound (b) with the copolymer A and a polymerization step of polymerizing the α,β-unsaturated hydrophobic compound (b) dispersed with the copolymer A.

4. The image recording method according to claim 1, wherein a proportion (% by mass) of the copolymer A to the polymer particle is 0.11 times or more and 0.43 times or less as much as the proportion (% by mass) of a unit derived from the compound (b).

5. The image recording method according to claim 1, wherein a content (% by mass) of the coloring material in the ink is 0.1 times or more and 1.5 times or less in terms of mass ratio with respect to the content (% by mass) of the polymer particle.

6. A set of an ink jet ink and a liquid composition, comprising an ink jet ink containing a coloring material and a polymer particle and a liquid composition which destabilizes a dispersion state of the polymer particle in the ink, wherein the polymer particle in the ink has a core portion and a shell portion, the shell portion contains a copolymer A having a unit derived from a compound (a1) represented by a general formula (1) of $R_1—(C_2H_4O)_n—C_2H_4OCO—R_2—COOH$ where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less, or a general formula (2) of $R_1—(C_2H_4O)_n—C_2H_4O—R_2—COOH$ where $R_1$ is at least one selected from a vinyl group, an allyl group, an acryloyl group and a methacryloyl group, $R_2$ is at least one selected from an alkylene group, a cycloalkylene group and a phenylene group, and n is 10 or more and 100 or less and having a unit derived from an α,β-unsaturated hydrophobic compound (a2), a proportion of the unit derived from the compound (a1) to the copolymer A is 50% by mass or more and 90% by mass or less, a proportion of the unit derived from the compound (a2) to the copolymer A is 10% by mass or more and 50% by mass or less, and the core portion contains a polymer of an α,β-unsaturated hydrophobic compound (b).

* * * * *